United States Patent [19]
Bernier et al.

[11] 3,929,734

[45] Dec. 30, 1975

[54] FIRE-RESISTANT POLYAMIDE FROM BROMINATED AROMATIC DICARBOXYLIC ACID DIARYL ESTER

[75] Inventors: Cécile Bernier, Bagneux; Monique Jouhaneau, Issy-Les-Moulineaux; Pierre Poisson, Antony, all of France

[73] Assignee: Aquitaine Total Organico, France

[22] Filed: Feb. 4, 1974

[21] Appl. No.: 439,122

[30] Foreign Application Priority Data
Feb. 8, 1973 France ............................. 73.04442
Feb. 14, 1973 France ............................. 73.05159

[52] U.S. Cl. ......... 260/78 R; 260/33.4 R; 260/468 J
[51] Int. Cl.² ............................................ C08G 69/42
[58] Field of Search .................................. 260/78 R

[56] References Cited
UNITED STATES PATENTS
3,194,794  7/1965  Caldwell et al. ............... 260/78 R
FOREIGN PATENTS OR APPLICATIONS
108,329  10/1958  Pakistan Primary Examiner—Harold D. Anderson
Attorney, Agent, or Firm—Ostrolenk, Faber, Gerb & Soffen

[57] ABSTRACT

Fire-resistant thermoplastic brominated semi-aromatic polyamides, obtained by polycondensation of at least one linear or branched alpha-omega diamino-alkane of 4 to 30 carbon atoms with at least one arylic diester of an aromatic acid containing at least one bromine atom on the aromatic nucleus.

Brominated, dibrominated or chlorobrominated polyterephthalamides and/or isophthalamides, obtained by condensation of the corresponding aryl diesters and diamines such as 1-12-dodecane diamine, 1-9-nonane diamine, and 2-2-4 and/or 4-4-2-trimethyl hexane diamines.

These resins can be used, in powder form and as moulded or extruded materials, in numerous fields, particularly textiles, coverings, electrical insulators, mechanical parts and building materials.

13 Claims, No Drawings

FIRE-RESISTANT POLYAMIDE FROM BROMINATED AROMATIC DICARBOXYLIC ACID DIARYL ESTER

This invention concerns fire-resistant thermoplastic resins, and more specifically thermoplastic brominated semi-aromatic polyamides with high molecular weight. It also concerns the process for preparing them.

It is already known that plastics, notably polyamides, can be made fire-resistant by adding and mixing in halogenated compounds containing chlorine, bromine, iodine or fluorine, which make them non-flammable or self-extinguishing, the exact properties varying depending on the nature of the halogen or halogen mixture.

The semi-aromatic polyamides concerned by this invention can be distinguished from such existing plastics in that their combustibility is greatly reduced, not by halogenated additives but because they comprise at least one bromine atom in their recurrent structural element, fixed to the aromatic nucleus.

Apart from conferring fireproofing qualities on the polyamides, the bromine atoms fixed to the nucleus do not significantly alter their characteristic mechanical properties, as the earlier additives do.

Brominated polyamides obtained by means of this invention have a very wide field of application as good fire-resistant materials, which can be moulded, injected and drawn, and are used in textiles, electrical insulators and fireproof coverings and building materials.

These fire-resistant polyamides are obtained by polycondensation of linear diamines of at least four carbon atoms with at least one diarylic ester of a dicarboxylic aromatic acid, on the nucleus of which at least one bromine atom is fixed.

Polyamides can be obtained by an existing polycondensation process in which the monomers, namely the diacids or their esters or the diamines or their salts, are heated together in a molten state in an inert gas atmosphere, and at suitable pressure.

West German Pat. No. 1.453.519 filed by Chemische Werke Witten describes a polycondensation process for methylic esters of iso- and terephthalic acids, or a mixture of these esters with diamines, with prepolycondensation by preliminary heating of the reagents in the presence of water. This method cannot be applied to alkyl esters of terephthalic and isophthalic acids having at least one bromine atom fixed on the nucleus, since such alkyl esters, and notably methyl esters, become decarboxylized under polycondensation conditions at temperatures of 200° to 260°C.

American Pat. No. 3.194.794 filed by Eastman Kodak describes polymers obtained from di- or tetra-chlorinated aromatic dicarboxylic acids and a diol or diamine of at least 4 carbon atoms, by a process involving:
  prepolymerization of an aryl diester of a polychlorinated aromatic diacid, such as diphenyl 2,5-dichloroterephthalate, with an equimolecular proportion of diamine, in a vacuum at 200° to 350°C;
  atomization of the prepolymer;
  heating of the powder obtained to a temperature of approximately 175°C, until suitable viscosity is obtained.

Furthermore, this patent concerns only chlorinated dicarboxylic aromatic acid polyamides.

The new fire-resistant polyamides proposed in this invention offer the advantage of much more effective fireproofing qualities than chlorinated polyamides.

For an equal percentage weight of halogen, brominated polyamide is 5 to 15 times safer, depending on circumstances, than the corresponding chlorinated polyamide, all other things being equal.

These brominated semi-aromatic polyamides with high molecular weight are obtained quickly and in a single operation, without precondensation, by heating stoichiometric quantities of diaryl esters of halogenated aromatic diacids comprising at least one bromine atom, and diamines. This method is fast and simple, since it merely involves heating the monomers to a temperature of between 180° and 300°C, in an inert atmosphere, with removal of the phenol or cresol released.

The polycondensation reaction can be performed in the presence of a mixture of diamines and a mixture of diesters.

It can also be performed in the presence of a chain-limiting ester such as phenyl acetate or phenyl benzoate, or even in the presence of a slight excess of one of the initial substances.

The diamines used in the polycondensation reaction are linear or branched aliphatic diamines of at least 4 and not more than 30 carbon atoms, such as the long-chain aliphatic diamines described in French Pat. No. 2.097.517, entitled "A process for preparing long-chained alpha-omega diaminoalkanes", filed by Aquitaine Total Organico on July 9, 1970.

Aryl esters that can be used in the polycondensation reaction are aromatic dicarboxylic acid aryl esters, particularly aryl diesters of mono- or polybrominated iso- and terephthalic acids, and notably phenyl, tolyl and cresyl esters of the following acids:

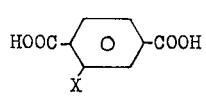
bromoterephthalic

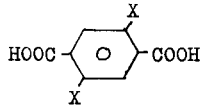
dibromoterephthalic

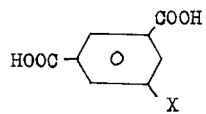
bromoisophthalic

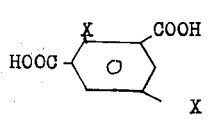
dibromoisophthalic

Chlorobrominated acids with the following formulae can also be used:

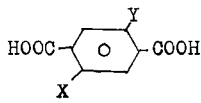
chlorobromoterephthalic

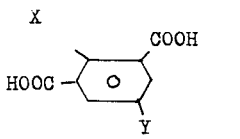
chlorobromoisophthalic

X = Br   Y = Cl

These aryl diesters of mono-, poly- or chlorobrominated diacids have not yet been described in any publication, to our knowledge.

Various processes exist for preparing diaryl esters of non-halogenated aromatic carboxylic acids, either using acid chlorides of these aromatic diacids, or by transesterification of alkyl esters of dicarboxylic aromatic diacids with aryl esters of monocarboxylic aromatic acids. These processes are described in French Pat. No. 1.400.949 and used in East German Pat. No. 74.792, an addition to Chemische Werke Witten's patent 45.719.

To obtain aryl diesters of brominated dicarboxylic aromatic acids, transesterification must be performed without excess aliphatic acid aryl ester and in close to stoichiometric proportions, so that the molar ratio of the aryl ester of the aliphatic acid to the alkyl ester of the brominated or chlorobrominated aromatic diacids is approximately 2:1. The reaction is performed in the presence of a transesterification catalyst, such as zinc acetate, litherge or antimony oxide, but the catalyst is preferably selected from the group of alkyltitanates and alkylzirconates, and particularly tetrabutyl-ortho-titanate, tetrabutyl-ortho-zirconate, tetra-isopropyl-ortho-titanate and tetra-isopropyl-ortho-zirconate.

The amount of catalyst added to the reaction medium ranges from 0.7 to 2 %, and preferably 0.8 to 1 %, of the weight of alkyl ester.

Aryl esters of monocarboxylic aliphatic acids used in transesterification are selected from the group of phenyl, tolyl and naphthyl acetates, propionates and butyrates. For economic reasons, however, and to facilitate elimination of the mono-alkyl ester resulting from transesterification, acetates and propionates are preferably used, since the boiling point of their alkyl esters is below 100°C.

Alkyl esters of halogenated carboxylic aromatic acids for transesterification are preferably taken from the group of chlorinated and brominated iso- and terephthalates, such as methyl and ethyl monobromo-, dibromo- and chlorobromophthalates, and methyl and ethyl monobromo-, polybromo-, monochloro, polychloro- and chlorobromonaphthenates.

The substances to be subjected to the transesterification reaction are placed in contact, in the absence of active charcoal, and stirred and heated to a temperature of 150° to 200°C, in an inert gas atmosphere and at atmospheric pressure, for the length of time needed for total elimination of the aliphatic carboxylic acid or alcohol alkyl ester resulting from transesterification, and to ensure a conversion rate close to 100 %.

The invention is illustrated by, without being confined to, the following examples.

EXAMPLE 1

Preparation of diphenyl monobromoterephthalate 27.3 g (0.1 mole) of dimethyl monobromoterephthalate and 26.8 g (0.2 mole) of phenyl acetate were mixed and placed in a balloon-flask fitted with a stirring system, inert gas inlet and outlet equipped with reflux condenser; the temperature could be measured in the reactive mixture, and the equipment was completed by a system of traps, allowing volatile products forming during the reaction to be collected.

The apparatus was blown through with the inert gas at room temperature. It was then heated to beyond 150°C (approximately 150° to 160°C), and kept for 30 minutes at this temperature. The catalyst, 0.2 ml tetrabutyl orthotitanate, was then added, and the temperature raised to around 190°C for a period of some six hours, during which the theoretical quantity of methyl acetate was collected.

The cake obtained was crystallized in acetic acid, thus producing the diphenyl monobromoterephthalate, which contained 20.15 % bromine (measured by the Schoeniger method), and had a melting point of 160°C (Kofler and DTA), and a saponification index of 289.

EXAMPLE 2

Preparation of ditolyl monobromoterephthalate

The same equipment as in example 1 was used. 27.3 g (0.1 mole) of dimethyl bromoterephthalate and 22.4 g (0.205 mole) of metacresol were placed in the reaction flask. A flow of nitrogen was maintained throughout the period of reaction. The apparatus was heated to 150°C for 20 minutes, after which 0.2 g tetrabutyl titanate was added. The temperature was then raised to 180°C and kept there until the calculated quantity of methanol had been recovered.

The temperature was then lowered. The reactive mixture quickly solidified. The resulting product, after being crystallized in acetic acid, had a melting point of 132°C, and a saponification index, measured experimentally, of 262 (compared with a calculated index of 264).

EXAMPLE 3

Preparation of diphenyl dibromoterephthalate 17.6 g ($5 \times 10^{-2}$ mole) of dimethyl dibromoterephthalate were placed in 13.6 (0.1 mole) of phenyl acetate. The mixture was homogenized in nitrogen and heated to around 160°C. As in example 2, the flow of nitrogen was maintained throughout the reaction period. The temperature of 160°C was held for 30 minutes, after which 0.2 g of tetrabutyl titanate were added. It was then heated to 190° to 200°C for nine hours, on completion of which the calculated quantity of methyl acetate had been recovered.

The product, after being crystallized in acetic acid, had a melting point of 182°C, and a saponification index measured experimentally of 233, (compared with a calculated index of 235).

EXAMPLE 4

Preparation of diphenyl bromochloroterephthalate 30.75 g (0.1 mole) of dimethyl chlorobromoterephthalate and 19.5 g (0.208 mole) of phenol were placed in a flask, which had first been dried. The reactive mixture was heated to 160°C for 20 minutes, after which 0.3 g tetrabutyl zirconate were added. It was then heated to 180°C for 10 hours, to allow almost the theoretical quantity of $CH_3OH$ to be recovered.

The product was washed in water, to remove the slight excess of phenol, and then dried.

After crystallization in acetic acid, the white crystallized product had a melting point of 170°–173°C, and a saponification index of 263 (compared with a calculated index of 265).

The process can be applied to all mono- or polyhalogenated aromatic aryl esters. The examples described above provide diesters that are sufficiently halogenated to make polyamides obtained by condensation of the diesters with aliphatic diamines fireproof.

EXAMPLE 5

39.7 g (0.1 mole) of diphenyl monobromoterephthalate, prepared as in example 1, 20.03 g (0.1 mole) of 1-12-dodecane diamine, and 0.136 g (1 molar %) of phenyl acetate were placed in a reactor equipped with a stirring system, gas inlet and outlet tube for connection to a downward-flow condenser. An inert atmosphere was created inside the equipment and it was submerged in a bath, heat-controlled to 230°C, for 15 minutes. The released phenol was removed by distillation. If necessary, a slight vacuum can be applied to facilitate elimination of the phenol retained in the viscous mass.

The resulting polyamide had an inherent viscosity of 0.98 measured in the m-cresol, a melting point of 212°C, and heat stability of 350°C. The bromoterephthalamide is fire-resistant, and complies with current legislation.

The limit oxygen index was 0.34 (ASTM and Underwriters' Laboratories test).

The properties of this polyamide allow it to be used in a wide range of mechanical and electrical fields.

EXAMPLE 6

Using the polycondensation method described in example 5, a polyamide was produced from diphenyl bromoterephthalate, prepared in accordance with example 1, and from 1,22-docosane diamine. It had an inherent viscosity of 0.9 and a melting point of 200°C.

EXAMPLE 7

Diphenyl bromoterephthalate, prepared in accordance with example 1, was polycondensed with 1,9-nonane diamine, using the method described in example 5. The resulting product had a viscosity of 0.9, a melting point of 145°C, and heat stability of above 350°C.

EXAMPLE 8

A polyamide was produced from ditolyl monobromoterephthalate, prepared in accordance with example 2, and from 1,6-hexane diamine, using the method described in example 5. This polybromoterephthalamide had an inherent viscosity of 0.93, a melting point of 270°C and a limit oxygen index of 0.4.

EXAMPLE 9

Using the method described in example 5, diphenyl dibromoterephthalate, prepared in accordance with example 3, was polycondensed with trimethylhexanemethylene diamine. The resulting polybromoterephthalamide had a melting point of approximately 300°C, and heat stability of above 350°C.

EXAMPLE 10

Diphenyl chlorobromoterephthalate, prepared in accordance with example 4, was polycondensed with 1,9-nonane diamine, using the method described in example 5. The resulting polyamide had a melting point of 250°C, an inherent viscosity of 0.95 and a limit oxygen index of 0.40.

What is claimed is:

1. A fire-resistant brominated semi-aromatic polyamide thermoplastic resin condensation product of ingredients consisting essentially of at least one alpha,omega-diaminoalkane of 4–30 carbon atoms and at least one aryl diester of isophthalic acid or terephthalic acid, said isophthalic acid or terephthalic acid having at least one bromine on the aromatic nucleus thereof.

2. The fire-resistant brominated semi-aromatic polyamide of claim 1 wherein said isophthalic acid or terephthalic acid having at least one bromine on the aromatic nucleus thereof is selected from the group consisting of bromoterephthalic acid, dibromoterephthalic acid, chlorobromoterephthalic acid, bromoisophthalic acid, dibromoisophthalic acid and chlorobromoisophthalic acid.

3. The fire-resistant brominated semi-aromatic polyamide of claim 1 wherein said aryl diester is diphenyl bromoterephthalate and wherein said diaminoalkane is selected from the group consisting of 1,12-dodecane diamine, 1,22-docosane diamine, and 1,9-nonane diamine.

4. The fire-resistant brominated semi-aromatic polyamide of claim 1 wherein said aryl diester is ditolyl bromoterephthalate and said diaminoalkane is 1,6-hexane diamine.

5. The fire-resistant brominated semi-aromatic polyamide of claim 1 wherein said aryl diester is diphenyl dibromoterephthalate and said diaminoalkane is trimethyl hexamethylene diamine.

6. The fire-resistant brominated semi-aromatic polyamide of claim 1 wherein said aryl diester is diphenyl chlorobromoterephthalate and said diaminoalkane is 1,9-nonane diamine.

7. A single-step polycondensation process for the production of a brominated semi-aromatic polyamide thermoplastic resin without intermediate formation of a prepolymer which consists essentially of heating to a temperature of 180°–300° C., in an inert atmosphere and with stirring, a mixture of at least one alpha,omega-diaminoalkane of 4–30 carbon atoms and an about stoichiometric amount of at least one aryl diester of isophthalic acid or terephthalic acid, said isophthalic acid or terephthalic acid having at least one bromine on the aromatic nucleus thereof, with simultaneous elimination of the phenols released during the reaction.

8. The process of claim 7 wherein the phenols are eliminated by distillation.

9. The process of claim 7 wherein said isophthalic acid or terephthalic acid having at least one bromine on the aromatic nucleus thereof is selected from the group consisting of bromoterephthalic acid, dibromoterephthalic acid, chlorobromoterephthalic acid, bromoisophthalic acid, dibromoisophthalic acid and chlorobromoisophthalic acid.

10. The process of claim 7 wherein said aryl diester is diphenyl bromoterephthalate and wherein said diaminoalkane is selected from the group consisting of 1,12-dodecane diamine, 1,22-docosane diamine, and 1,9-nonane diamine.

11. The process of claim 7 wherein said aryl diester is ditolyl bromoterephthalate and said diaminoalkane is 1,6-hexane diamine.

12. The process of claim 7 wherein said aryl diester is diphenyl dibromoterephthalate and said diaminoalkane is trimethyl hexamethylene diamine.

13. The process of claim 7 wherein said aryl diester is diphenyl chlorobromoterephthalate and said diaminoalkane is 1,9-nonane diamine.

* * * * *

UNITED STATES PATENT AND TRADEMARK OFFICE
CERTIFICATE OF CORRECTION

PATENT NO. : 3,929,734
DATED : December 30, 1975
INVENTOR(S) : Cecile Bernier, Monique Jouhaneau and Pierre Poisson It is certified that error appears in the above-identified patent and that said Letters Patent are hereby corrected as shown below:

For the name of the assignee read -- ATO CHIMIE, France --.

Signed and Sealed this twenty-fifth Day of May 1976

[SEAL]

Attest:

RUTH C. MASON
Attesting Officer

C. MARSHALL DANN
Commissioner of Patents and Trademarks